R. C. SHELTON.
TRACTOR CULTIVATOR.
APPLICATION FILED OCT. 1, 1919. RENEWED SEPT. 14, 1921.

1,395,210.

Patented Oct. 25, 1921.
3 SHEETS—SHEET 1.

Inventor
Roy C. Shelton,
By Ch. Parker
Attorney

Inventor
Roy C. Shelton,

UNITED STATES PATENT OFFICE.

ROY C. SHELTON, OF NASHVILLE, TENNESSEE.

TRACTOR-CULTIVATOR.

1,395,210.

Specification of Letters Patent.  Patented Oct. 25, 1921.

Application filed October 1, 1919, Serial No. 327,726. Renewed September 14, 1921. Serial No. 500,669.

*To all whom it may concern:*

Be it known that I, ROY C. SHELTON, a citizen of the United States, residing at Nashville, in the county of Davidson and State of Tennessee, have invented certain new and useful Improvements in Tractor-Cultivators, of which the following is a specification.

This invention relates to improvements in tractor-cultivators.

An important object of the invention is to provide a tractor which may be used not only for the ordinary uses of a tractor but may also be used in the cultivation of growing plants until they have reached the height at which cultivation is discontinued. In the present forms of tractor designed for agricultural use, the body or frame of the tractor is held at such low level as to prevent cultivation of corn and the like after it has attained a material height. This objection necessitates the use of a draft animal in cultivation and has consequently been a serious draw back to the success of tractors. Hitherto in order to make a tractor of sufficient height to allow the cultivation of corn and the like until it has reached the size at which cultivation is discontinued, it has been necessary to make the tractor of such length as to preclude turning at the end of the rows without destroying a large portion thereof. I have evolved a tractor having peculiarly constructed wheels allowing of increasing the height of the body from the ground and at the same time reducing the length thereof.

Other objects and advantages will be apparent throughout the course of the following description.

In the accompanying drawings wherein for the purpose of illustration is shown a preferred embodiment of my invention and wherein like numerals designate like parts throughout, Figure 1 is a plan view of a tractor embodying my invention, the tractor wheels upon one side being shown in section.

Figure 1:
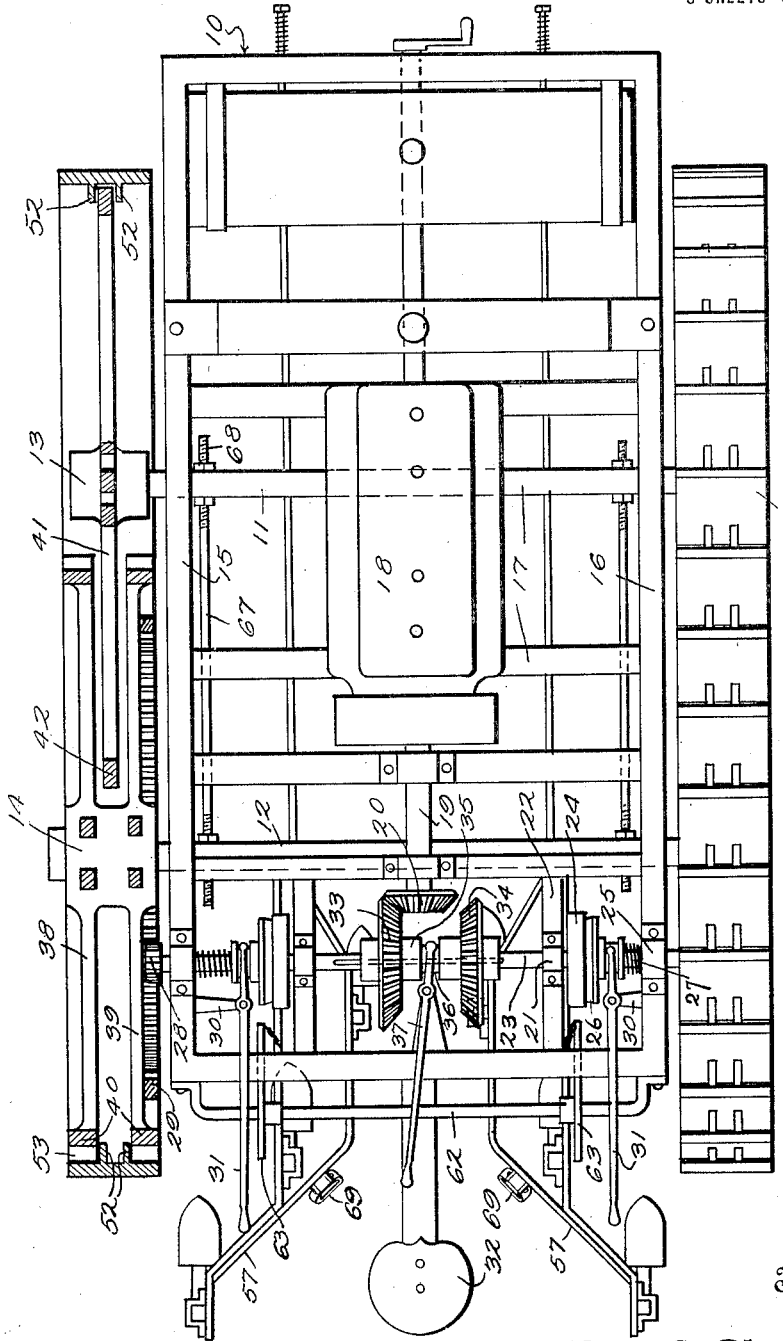

Referring now more particularly to the drawings the numeral 10 indicates the tractor frame as a whole, provided upon its under side with front and rear U axles 11 and 12 respectively.

The arms of the U of the axles depend and are provided with horizontal hub receiving portions as is well known. The arms are provided with openings adapted to receive the ends of a combined supporting and adjusting bar 67 provided with screw threaded ends 68. It will be seen that by adjusting the nuts upon the bar 67 the relative space between the hub receiving portions may be altered.

Mounted upon the front axles 11 are idler wheels 13 while the rear axle 12 bear traction wheels 14 to be more particularly described hereinafter.

The frame 10 comprises side bars 15 connected by transverse bars 17. Mounted upon the transverse bars 17 is a power plant 18 of any desirable type, having the usual power shaft 19, shown as provided upon its rear end with a bevel pinion 20.

The two rearmost transverse members 17 are connected by longitudinal cross bars 22 having journals 21 mounted thereon adapted to receive a transverse shaft 23. The ends of the shaft 23 are provided with one member of a clutch 24 shown in the present instance as being the female member of a cone clutch.

Mounted in journals 25 secured to the side bars 15 and 16 are transverse shafts alined with the shaft 23. These shafts are provided upon their inner ends with the male member 26 of the clutch 24 and a spring 27 surrounds the shafts intermediate the journals 25 and male members 26 of the clutch holding the clutch normally in engagement. The outer ends of the shafts are provided with pinions 28 meshing with gears 29 formed upon or secured to the traction wheels 14. A means for disengaging the clutch is shown in the present instance as comprising a lever 31 pivoted upon a bracket 30. One end of this lever extends in proximity to the driver's seat 32, the other end engaging in a groove formed in the male member of the clutch to operate it in the usual manner.

Mounted upon the shaft 23 are bevel gears 33 and 34 secured to a sleeve 35 having a central annular groove 36. A lever 37 pivotally connected with the frame engages in the groove 36 with one end and has its other end extending adjacent the driver's seat. It will be seen that by manipulation of the lever 37 either of the gears 33 or 34 may be brought into engagement with the pinion 20, the sleeve 35 being feathered upon the shaft 23.

Figure 2:
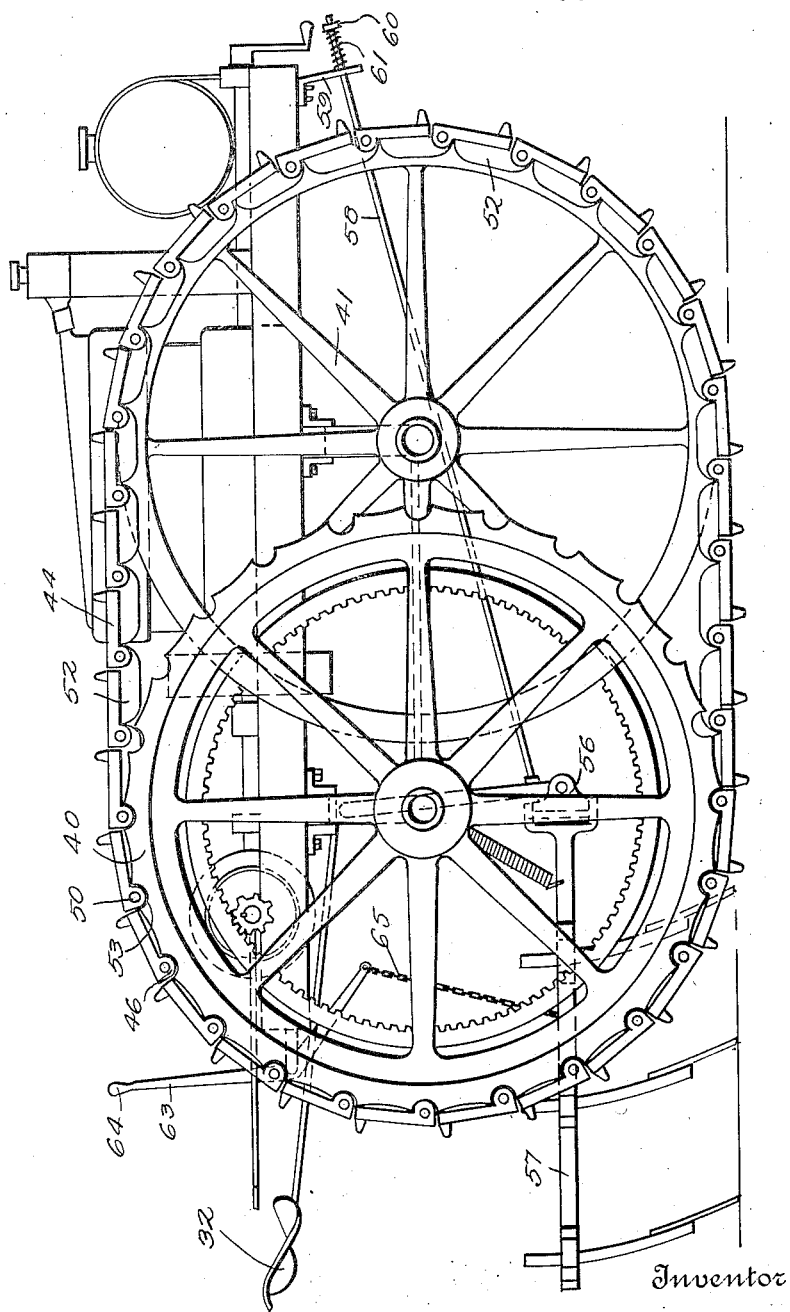
Fig. 2 is a side elevation thereof.

The traction wheel 14 comprises the usual hub having a pair of sets of spaced radial spokes 38 and 39, each of the sets of spokes carrying a felly 40. The idler wheel 13 has but a single set of spokes 41 carrying a rim 42. By inspecting Figs. 1 and 2 it will be noted that the felly and spokes of the idler wheel 13 extend intermediate the spaced pairs of spokes and fellies of the traction wheel 14. This feature allows a material shortening of the length of the tractor. For example if a 50-inch wheel is used the length from outside to outside of the idler and drive wheels, instead of being approximately nine feet will be reduced to approximately six feet.

The chain tread comprises plates or tread shoes 44 provided in one end with notches 45 and depending portions 46. The depending portions 46 are provided with alined openings 47. The opposite end of the shoe is provided with forwardly extending portions 48 adapted to extend into the notches 45 of the preceding plate having alined openings 49 adapted to coact with the openings 47 of the depending portions 46 to receive pivot pins 50. The forwardly extending portions 48 are shown in the present instance as being formed integrally with spaced tracks 52 formed upon the under side of the shoe for a purpose hereinafter to appear. The outer or operating face of the shoe is provided with the usual transverse mud lug 51. By examining Fig. 2 it will be seen that when the tread is assembled in position that the depending portions 46 engaging in alined grooves 53 formed transversely of the rims 40 of the traction wheel 14.

Figure 3:
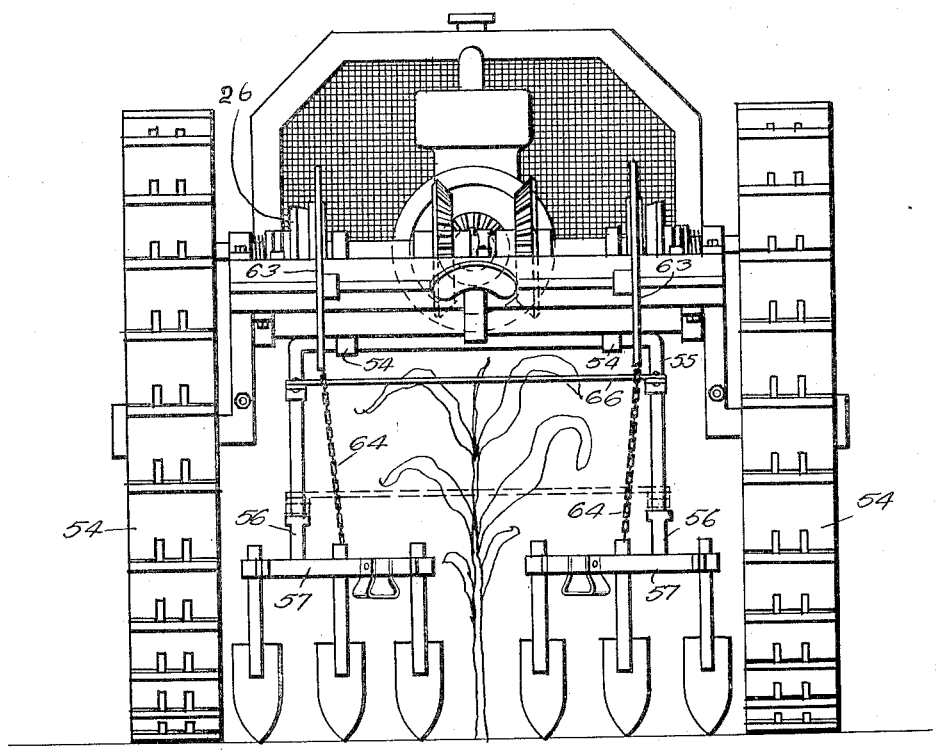
Fig. 3 is a rear elevation thereof.
Figure 4:
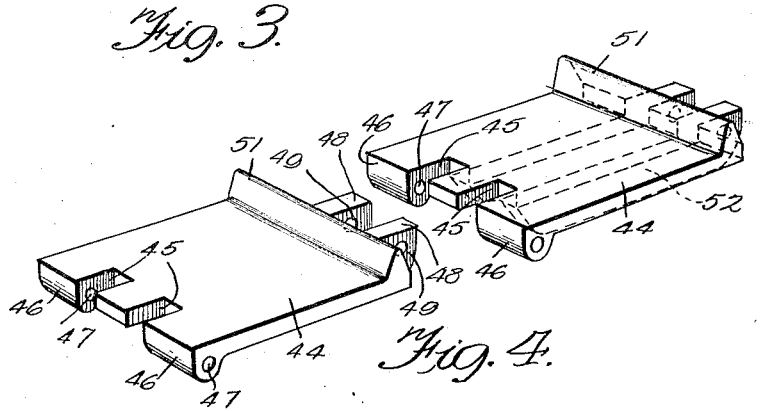
Fig. 4 is a combined perspective of a pair of tread shoes forming the chain tread of the tractor.

Mounted upon the under side of the frame 10 adjacent the rear end thereof are journals 54 in which is mounted a U frame 55, the arms of the U depending as clearly shown in Fig. 3. The lower ends of the arms of the U 55 are provided with universal couplings 56 providing means for attaching cultivator units 57. Extending forwardly from each arm of the U is a rod 58. The forward end of the rod extends through a bracket 59 secured to the frame 10 adjacent the forward end thereof and is provided with a stop 60. Extending intermediate the stop 60 and bracket 59 is a compression spring 61 coiled to the rod 58. Secured to the rear end of the frame 10 is a transverse support 62 upon which are pivotally mounted bell crank levers 63, one end of each lever terminating in a handle 64 arranged adjacent the driver's seat 32 and the other being connected by means of a flexible element 65 without the cultivator unit 57.

Mounted upon the U frame 55 is a vertically adjustable draw bar 66. When the tractor is in use for cultivation the draw bar 66 will be elevated as shown in Fig. 3. When it is desired to use the tractor for draft purpose as for example in hauling a reaper or the like the draw bar may be adjusted to the proper height as suggested by the dotted lines on Fig. 3.

The operation of my device is as follows:

The tread 54 surrounds the wheels 13 and 14, the tracks upon the under side of the shoe engaging the rim of the idler wheel 13 and the depending portions thereof being engaged by the transverse grooves of the rims 40 as previously described. It will be seen that power transmitted from the power plant drives the traction wheels 14 in either direction as may be desired and that by disengaging either of the clutches 24 but a single traction wheel is driven, this affording the usual turning mechanism. When in use for cultivation if one of the blades of the cultivator encounter an obstacle, the cultivator unit is allowed to shift to prevent undue strain thereon, and by manipulating the levers 63 either of the cultivator units as desired may be withdrawn from contact with the ground. I have provided upon each of the cultivator units a foot piece 69 whereby the cultivator may be shifted to avoid uprooting plants that are out of alinement with the row.

As many changes are possible in the shape size and arrangement of the various parts shown without in any manner departing from the spirit of my invention, I do not limit myself to the specific arrangement herein described, but may make any such changes without departing from the spirit of the invention, or the scope of the subjoined claim.

What I claim is:

In a tractor cultivator, a traction wheel arranged on each side of the tractor, each embodying a pair of spaced fellies, said fellies being provided with transverse alined grooves, an idler wheel arranged on each side of the tractor, each embodying a single felly, the fellies of said idler wheels extending between the fellies of said traction wheels and being spaced transversely therefrom, and a flexible endless tread surrounding each side of said wheels and embodying links, each of said links comprising a flat rectangular body portion of a width substantially equal to that of the traction wheel, said body portion being provided upon its inner face with spaced longitudinal tracks adapted to receive said idler wheels therebetween, the spaced fellies of said traction wheels being adapted to receive said tracks therebetween, said body portion being further provided on one end with a pair of spaced ears, said ears projecting inwardly of the body portion and being provided with openings, a pair of relatively wide ears carried by the opposite end of said body portion and projecting inwardly therebeyond, the inwardly projecting portions of said last named ears being adapted to be received in the transverse grooves of said traction wheels, said first named ears being received between the last named ears of the next link of the chain, and a pivot pin passing through said ears.

In testimony whereof I affix my signature.

ROY C. SHELTON.